No. 621,241. Patented Mar. 14, 1899.
N. K. GARHART.
ELECTRICAL CONTROLLER.
(Application filed Aug. 8, 1898.)

(No Model.) 5 Sheets—Sheet 1.

Witnesses
R. D. Hawkins
Minnie C. Buck

Inventor
Nathan K. Garhart
By V. H. Lockwood
His Attorney.

No. 621,241. Patented Mar. 14, 1899.
N. K. GARHART.
ELECTRICAL CONTROLLER.
(Application filed Aug. 8, 1898.)

(No Model.) 5 Sheets—Sheet 2.

Witnesses
R. D. Hawkins
M. C. Buck.

Inventor
Nathan K. Garhart
By V H Lockwood
His Attorney.

No. 621,241. Patented Mar. 14, 1899.
N. K. GARHART.
ELECTRICAL CONTROLLER.
(Application filed Aug. 8, 1898.)
(No Model.) 5 Sheets—Sheet 3.
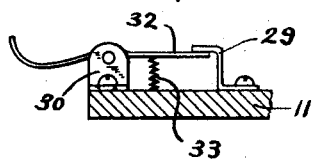
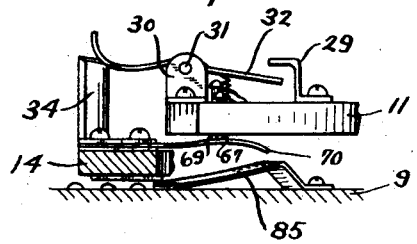
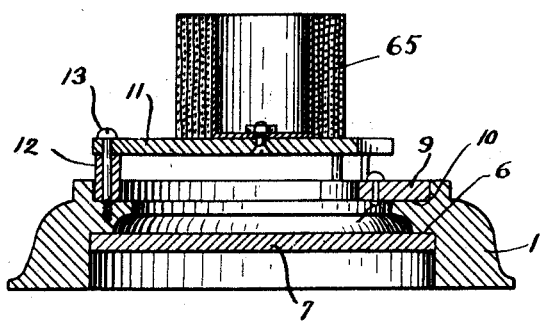
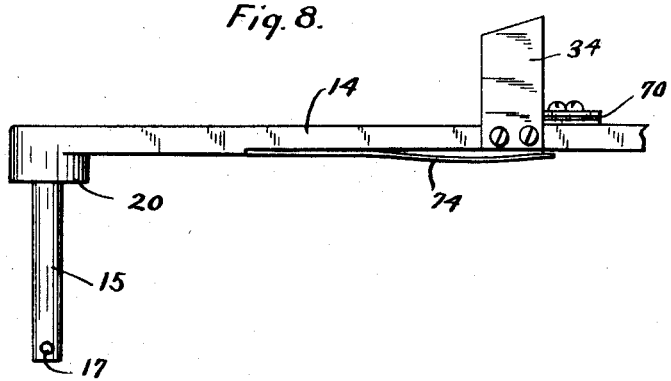
Witnesses
R. D. Hawkins
M. C. Buck
Inventor
Nathan K. Garhart
By V. H. Lockwood
His Attorney.

No. 621,241. Patented Mar. 14, 1899.
N. K. GARHART.
ELECTRICAL CONTROLLER.
(Application filed Aug. 8, 1896.)
(No Model.) 5 Sheets—Sheet 4.
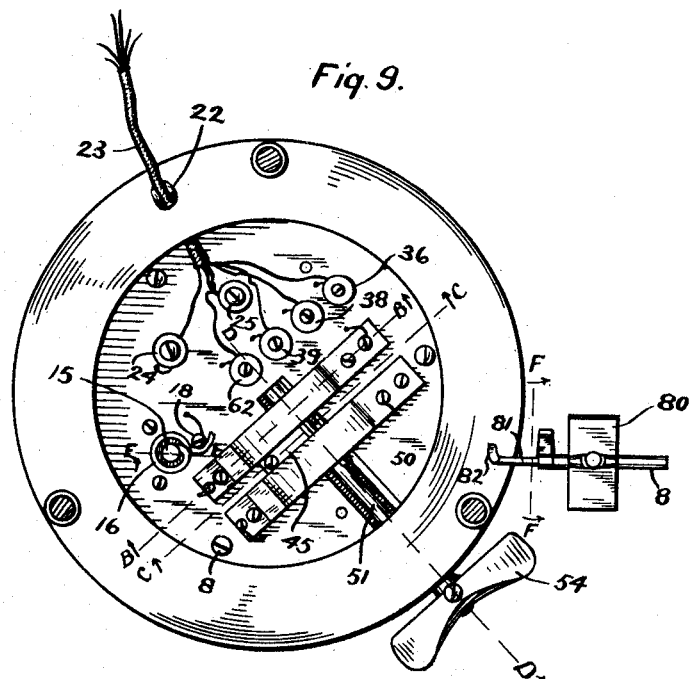
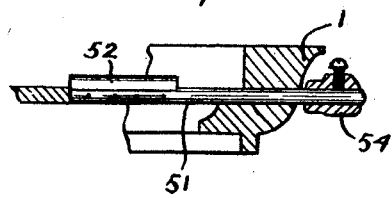
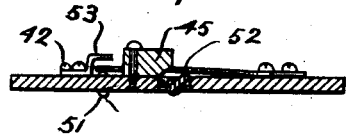
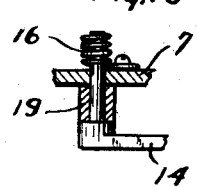
Witnesses
R. D. Hawkins.
M. C. Buck.
Inventor
Nathan K. Garhart
By T. H. Lockwood
His Attorney.
THE NORRIS PETERS CO., PHOTO-LITHO., WASHINGTON, D. C.

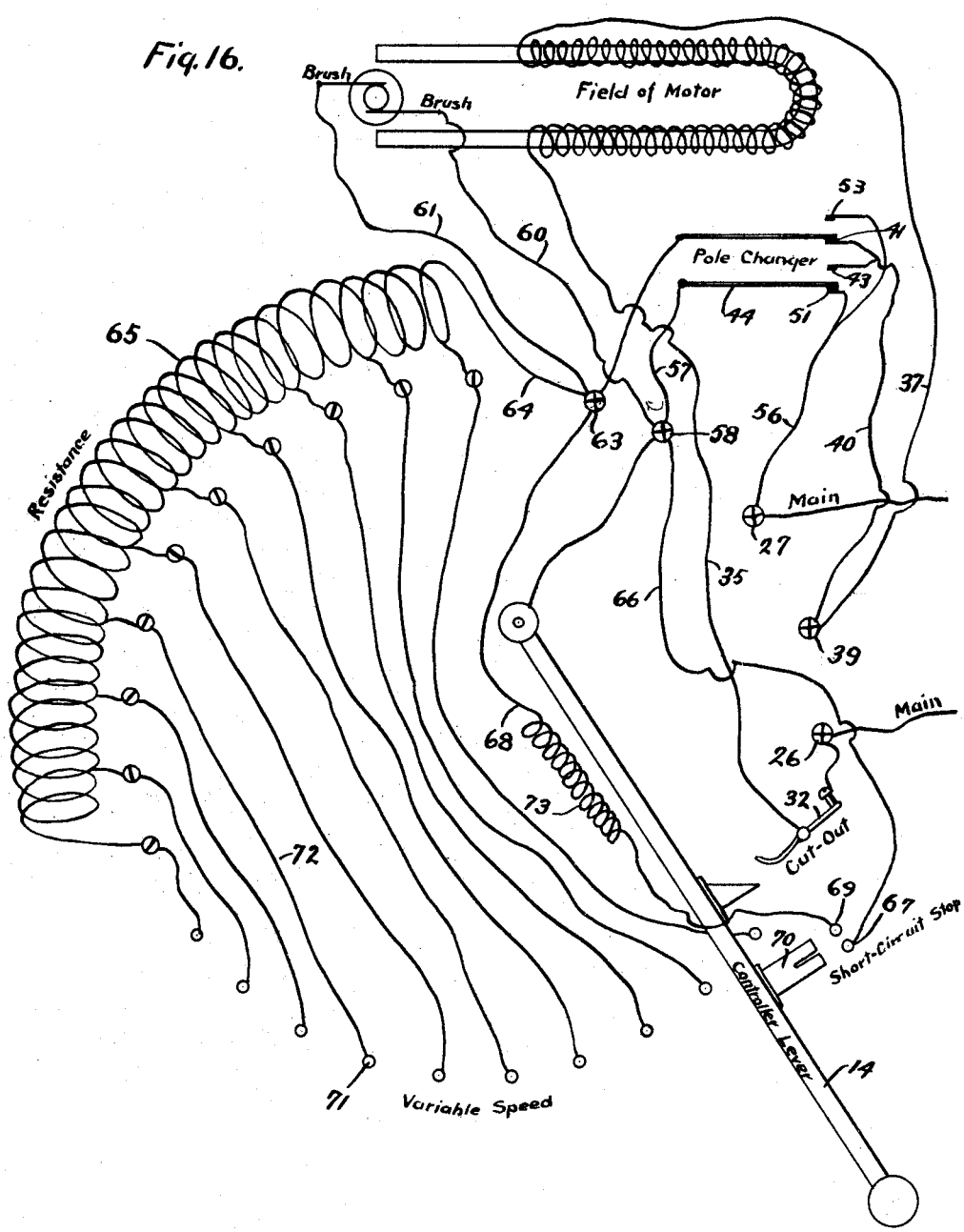

UNITED STATES PATENT OFFICE.

NATHAN K. GARHART, OF INDIANAPOLIS, INDIANA.

ELECTRICAL CONTROLLER.

SPECIFICATION forming part of Letters Patent No. 621,241, dated March 14, 1899.

Application filed August 8, 1898. Serial No. 688,106. (No model.)

*To all whom it may concern:*

Be it known that I, NATHAN K. GARHART, of Indianapolis, county of Marion, and State of Indiana, have invented a certain new and useful Electrical Controller; and I do hereby declare that the following is a full, clear, and exact description thereof, reference being had to the accompanying drawings, in which like figures refer to like parts.

My invention relates to a pedal device for controlling an electrical current. When connected with a motor it will serve to start or stop the motor and also to regulate its speed and reverse the current. While this device may be used in connection with various kinds of electrical apparatus, the particular form of the invention set forth has been made and used by me in electrical dental and surgical engines. With the particular device shown the dentist or surgeon can readily control his electrical engine with his foot, starting or stopping it, changing the direction of the current, as well as varying the speed, and locking it, so as to maintain a certain speed.

The nature of this device, as well as the improvements and inventions I have made therein, will more fully appear from the accompanying drawings and the description and claims following.

Figure 1:
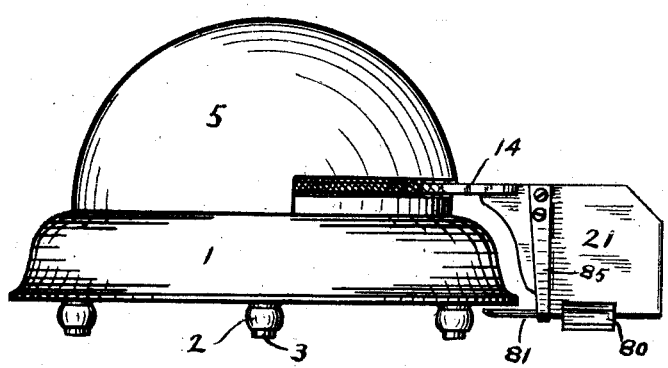
Figure 2:
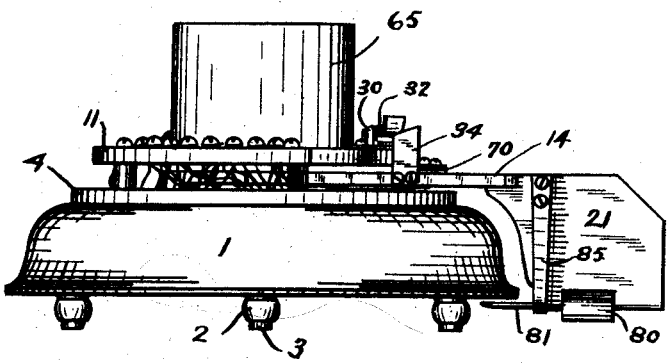
Figure 3:
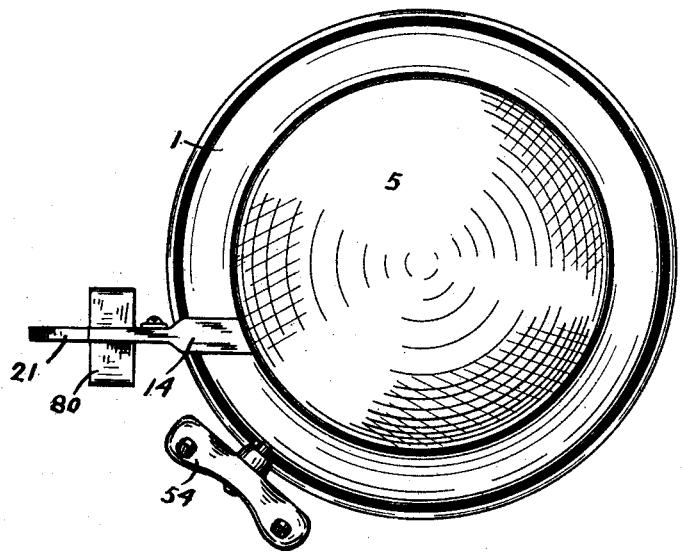
Figure 4:
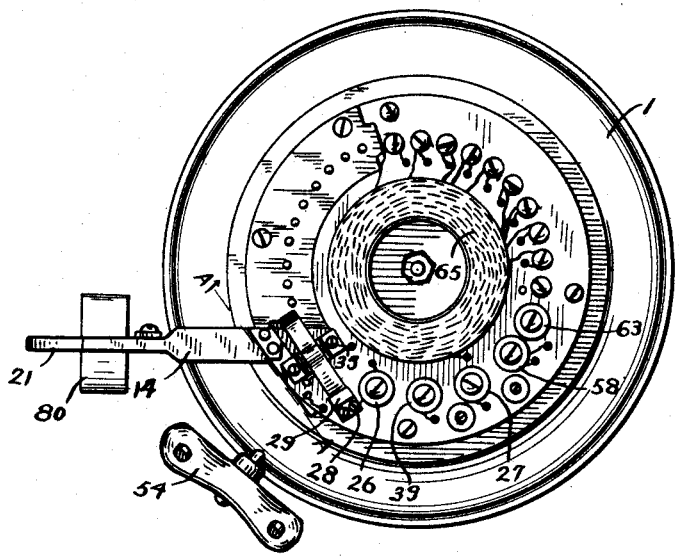

In the drawings, Figure 1 is a side elevation of my electrical controller. Fig. 2 is a side elevation thereof with the cap or cover removed. Fig. 3 is a plan of what is shown in Fig. 1. Fig. 4 is a plan of what is shown in Fig. 2. Fig. 5 is a central vertical section of what is shown in Figs. 2 and 4. Fig. 6 is a side elevation of the cut-off with the insulating supporting-plate in section and partly broken away. Fig. 7 is a section of the upper portion of the device on the line A A of Fig. 4, showing the cut-off, the lever, and the stop for the lever. Fig. 8 is a side elevation of the inner end of the lever. Fig. 9 is a bottom plan of the device. Fig. 10 is a section on the line B B of Fig. 9. Fig. 11 is a section on the line C C of Fig. 9. Fig. 12 is a section on the line D D of Fig. 9. Fig. 13 is a section on the line E E of Fig. 9. Fig. 14 is a section of the lever on the line F F of Fig. 9. Fig. 15 is an end elevation of the lever. Figs. 9 to 15, inclusive, show the parts in an inverted position. Fig. 16 is a diagram of the wiring and circuits.

Turning now to the details of construction as set out in this embodiment of my invention, 1 is the base of my device, made, preferably, of metal, supported upon short metal legs 2, which are screwed into the base and provided with the rubber tips 3. There may be three or more of these legs. The base, at its upper portion, has a vertically-extending flange or collar 4. A cap or semispherical cover 5 fits over the device, resting on the base around the collar 4. It is cut out along one edge to permit the movement of the lever when the cover is in place. The cover is made, preferably, of spun brass.

As seen in Fig. 5, an annular shoulder 6 is provided in the base 1, to which a plate 7 is secured by screws 8, as seen in Fig. 9. This plate is made of insulating material. A second plate 9, of insulating material, is in the form of a segment and secured by screws to the ledge 10, formed in the base, as seen in Fig. 5. This plate extends about one-third of the way around and is about flush with the upper edge of the base or collar portion 4 thereof. A third plate 11, of insulating material, is mounted, as shown in Fig. 5, on the posts 12, so as to hold it about a certain distance above the plates 7 and 9, and is secured to the posts by the screws 13. The lever oscillates horizontally between this plate 11 and the plate 9 or the upper edge of the base.

The lever 14, whose inner end is shown in Fig. 8, has at its inner end a downwardly-projecting spindle 15, that extends loosely through a hole in the lower insulating-plate 7. (See Figs. 9 and 13.) The spindle 15 is held downward by a spiral spring 16, coiled about that portion of it which extends below the plate 7. The lower end of the spring is fastened in a hole 17 in the spindle, (to be seen in Fig. 8,) while the upper end of the spring presses against the under side of the plate 7 and is held from rotation by the screw 18, (to be seen in Fig. 9.) The chief function of this spring is to tend to throw the lever 14 to the right or into its inoperative position, which position is shown in Figs. 1 and 2. This construction is shown in detail in an inverted position in Fig. 13. Upon the plate 7 and surrounding the spindle 15 of the lever 14 I mount a sleeve or post 19, upon which the shoulder 20 at the inner end of the lever 21 bears. This construction and mounting of the inner end of the lever permits said lever to oscillate horizontally when moved by the foot. The outer end of the lever is provided with a downward-projecting wing 21, as seen in Figs. 1 and 2, against which the foot acts.

A hole 22 is made through the lower part of the base, (seen in Fig. 9,) through which a cable 23 passes. In this manner the wires leading to and from this controlling device are carried. The main wires leading from some suitable source of current are connected with the binding-posts 24 and 25 on the under side of the plate 7. From that point they extend through said plate 7 and the plate 11 to the binding-screws 26 and 27, as seen in Fig. 4. The wire connecting with the binding-screw 26 extends to the binding-screw 28, and therefrom the current is conveyed through the cut-out to the field. The current passes first to the contact-piece 29, as seen in Figs. 6 and 7. On the plate 11 is mounted a pair of posts 30, carrying a small pivot 31, upon which is mounted a cut-out lever 32, one end of which is adapted to engage the contact-piece 29, as seen in Fig. 6. A spring 33 between the plate 11 and the lever 32 holds the latter normally in contact with the piece 29. The circuit is broken by the other end of the lever 32 being elevated by an extension 34 on the main lever 14 when the latter lever is moved to the right in the device shown. The end of the lever 32 with which the extension 34 engages is preferably upturned, as shown in Fig. 7, in order that it may be elevated by the lateral movement of the extension 34 on the lever 14. When the parts are in the position shown in Fig. 7, the circuit is cut out and the machine driven by the current is inoperative.

When the cut-out lever 32 is in the position shown in Fig. 6—i. e., in engagement with the contact-piece 29—the circuit is closed, it being continued by the wire 35, connected with one of the posts on which the cut-out lever 32 is mounted and extending to the binding-screw 36 (seen in Fig. 9) and from thence to the field of the motor. From the field of the motor the wire 37 extends to the binding-screw 38 on the bottom of the plate 7 and thence to the binding-screw 39 on the plate 11, as seen in Fig. 4. From that the wire 40 leads to the pole-changer—i. e., to the plug 41—and also to the binding-screw 42, connected with the contact-piece 43.

The pole-changer is in the nature of a double switch that performs the function of two switches. It consists of spring-strips 44, secured at one end parallel to each other on the under side of the plate 7. An insulating-block 45 separates them. Their free ends are movable between the contact-plugs 41 and 51 in plate 7 and the contact-pieces 43 and 53 held somewhat removed from said plate 7. These spring-metal strips 44 extend across a groove or slot 50 in plate 7, in which there extends a rod or key 51, carrying on its inner end an extension 52, made of insulating material and so arranged that when said key 51 is oscillated somewhat the extension 52 will engage and depress the free end of said spring-strips 44 out of engagement with the plugs and into engagement with the contact-pieces. The key 51 is oscillated by a foot-piece 54, here centrally secured to said rod, as shown Fig. 9. The extension 52 is made of such dimensions and so arranged that when it is moved into engagement with the spring-metal piece 44 by operating the foot-piece the friction will be sufficient to hold the parts in such position until the foot-piece is reversed. By this the circuit can be maintained in either direction as long as the operator desires and he will not be required to hold the foot-piece in any certain position with his foot during such time. The stop 45 prevents the key from being operated so far as to let the spring-strips disengage the contact-pieces 43 and 53.

The wire 40, above referred to, connects with the contact-piece 43 of one metal strip and with the plug 41, that engages the other metallic strip. The contact-piece 53 and the plug 51 are connected with the other main wire by a wire 56, that runs to the binding-screw 27, as seen in Fig. 4. From the pole-changer the wire 57 runs to the binding-screw 58, as seen in Fig. 4, and thence to the binding-screw 59 on the under side of the plate 7, and thence wire 60 extends through the cable 23 to the brush. The wire 61 extends from the brush to the binding-screw 62, as seen in Fig. 9, and thence to the binding-screw 63 in Fig. 4, and thence through the wire 64 connects with the resistance-coil 65. Here the resistance-coil consists of small German-silver wire insulated by asbestos cloth, as shown in Fig. 5. From the binding-screw 58 the wire 66 extends to the plug 67 and the wire 68 extends from the resistance-coil to the plug 69. The plugs 67 and 69 are closely located, so that the strip 70, secured to the lever 14, will engage them both simultaneously, and thereby establish a short circuit.

In order to vary the speed, a series of contact points or plugs 71 are mounted in the plate 9, where they will be engaged by the lever, and are connected by wires 72 to the resistance-coil at such points that the resistance increases as the lever is moved along from point to point in the series. The lever for this purpose has on the under side a metal spring 74, that engages the contact-points 71. In the wire 68 I also place a resistance-coil 73 for the purpose of controlling the current when the stop is made.

From this description it is seen that when the lever 14 is moved as far to the right as possible the cut-out is operated and the circuit opened. As the lever is moved to the left by the foot the cut-out mechanism is disengaged and the circuit established. Then as the lever is further moved to the left from one contact-point 71 to another the speed is increased. It may be decreased by moving the lever in the opposite direction. When it is desired to stop the motor, the lever is released by the foot, whereupon the spring 16 throws the lever to the right. As it moves to the right the short-circuit stops are first engaged and the motor is short-circuited to effect an immediate stoppage. This occurs before the lever reaches the cut-out mechanism. The direction of movement of the motor is reversed by operating the pole-changer with the foot, as has been described.

In order to hold the lever 14 in any desired position, I provide the following means. (Seen most clearly in Figs. 9, 14, and 15:) In the lower end of the wing 21, at the outer end of the lever 14, I secure a pedal-piece 80 to a rotatable rod or wire 81, that has a turned-up end 82, which frictionally engages the bottom of the base 1. By oscillating the pedal-piece 80 in one direction the frictional point 82 is turned up into engagement with the base 1, which will hold the lever 14 in the position in which it is placed if let alone. This frictional contact, too, permits the operator to move the lever without disengaging this stop—*i. e.*, he can move the lever to the right or left and it will stay where he places it, or he can reverse the movement of the pedal-piece 80, so as to disengage the point 82 from the base 1, which will render this frictional stop wholly inoperative.

In order to hold the stop in an operative or inoperative position, I provide the mechanism shown in Figs. 14 and 15. On the rod or wire 81 I provide an extension 84. It acts somewhat like a cam to engage a rib on the free end of the spring 85, that is secured to the wing 21 of the lever 14. In whichever position the rod or wire 81 is turned this stop mechanism will hold it in such position until it is changed by the foot of the operator engaging the pedal-piece 80. I provide also an inclined stop-spring 85 (to be seen in Fig. 7) to limit the movement and gradually stop the lever 14 when impelled to the right by the spring 16 and prevent rebound. It is thus seen that the operator can fully control his engine with his foot, varying the speed or reversing the current and maintaining the parts in position without attention from him.

The current through the device herein shown and described may be traced as follows by reference to Fig. 16: Take the lower main wire, as shown, for illustration. The current passes through it to the binding-post 26, thence to the cut-out, thence through wire 35 to the field, thence through wire 37 to the binding-post 39, and thence through the wire 40 and the upper metal strip 44 of the pole-changer to the binding-post 63. There the current divides. The main part goes through the wire 61 to the brush and thence through the wire 60 to the binding-post 58. The shunted current goes through the wire 64 and coil 65 and one of the wires 75 to the lever 14, when it is on one of the contact-points 71, and thence through the lever 14 to the binding-post 58. From the binding-post 58 the united current passes through the wire 57, lower strip 44 of the pole-changer, wire 56 to the binding-post 27, and out over the main leading therefrom. When the lever 14 is moved to its right-hand limit into contact with the contact-points 67 and 69, the current instead of leaving the binding-post 63, as above stated, short-circuits through the wire 68, piece 70 on the lever 14, and wire 66 to the binding-post 58, thus instantly stopping the brush-circuit until the cut-out 32 is operated in the final closing movement of the lever. When the current is reversed by the pole-changer, its direction of movement is the opposite of that above described.

What I claim as my invention, and desire to secure by Letters Patent, is—

1. An electrical controller including a suitable frame, a horizontally-rotatable lever adapted to be actuated by the foot, a horizontal rod rotatably mounted in the lever with an upturned end that engages the frame when the rod is oscillated, and a pedal-piece secured to such rod for oscillating it.

2. An electrical controller including a suitable frame, a horizontally-movable lever adapted to be actuated by the foot, means on the lever for engaging the frame and holding the lever in a certain position, and a spring that will hold such engaging means in its operative and inoperative positions.

3. An electrical controller including a lever, a cut-out mechanism that is actuated by the lever, and a short-circuit so located as to be closed by the lever before it reaches the cut-out mechanism.

4. An electrical controller including a lever, a cut-out mechanism that is actuated by the lever, a short circuit so located as to be closed by the lever before it reaches the cut-out mechanism, a spring that tends to move the lever toward the cut-out mechanism, and a stop-spring that prevents a rebound of said lever.

5. An electrical controller including a plate with a slot in it, a spring-strip secured to the plate at one end so as to extend across the slot with the other end free to move between two contact-points, and a rotatable key mounted in the slot with an extension to actuate the spring-strip when the key is operated.

6. An electrical controller including an insulating-plate with a slot in it, a spring-strip secured to the plate at one end so as to extend across the slot and the other end free to move between two contact-points, a key mounted in such slot with an extension thereon made of insulating material to actuate the spring-strip, and a pedal-piece on the key whereby it may be actuated by the foot.

7. An electrical controller including a suitable annular base, an insulating-plate therein provided with a slot, a pair of spring-strips secured to the plate at one end so as to extend across the slot with the other end free to move between contact-points, an insulating-block between said metal strips, a key extending through a suitable hole in the base and through said slot with an insulating extension thereon to actuate the metallic strips, and a pedal-piece on such key for actuating it by the foot.

In witness whereof I have hereunto affixed my signature in the presence of the witnesses herein named.

NATHAN K. GARHART.

Witnesses:
V. H. LOCKWOOD,
MINNIE C. BUCK.